Sept. 19, 1961 H. M. FRIEDRICHSEN 3,000,487

STENCIL-CHARACTER-FORMING APPARATUS

Filed Feb. 11, 1960 7 Sheets-Sheet 1

*INVENTOR.*
HANS M. FRIEDRICHSEN

*BY*

Kenway, Jenney, Witter & Hildreth
ATTORNEYS

STENCIL-CHARACTER-FORMING APPARATUS

Filed Feb. 11, 1960 7 Sheets-Sheet 2

INVENTOR.
HANS M. FRIEDRICHSEN
BY
Kenway, Jenney, Witter & Hildreth
ATTORNEYS

Sept. 19, 1961 H. M. FRIEDRICHSEN 3,000,487

STENCIL-CHARACTER-FORMING APPARATUS

Filed Feb. 11, 1960 7 Sheets-Sheet 3

INVENTOR.
HANS M. FRIEDRICHSEN
BY
Kenway, Jenney, Witter & Hildreth
ATTORNEYS

Sept. 19, 1961 H. M. FRIEDRICHSEN 3,000,487

STENCIL-CHARACTER-FORMING APPARATUS

Filed Feb. 11, 1960 7 Sheets-Sheet 4

INVENTOR.
HANS M. FRIEDRICHSEN
BY
Kenway, Jenney, Witter & Hildreth
ATTORNEYS

STENCIL-CHARACTER-FORMING APPARATUS

Filed Feb. 11, 1960 7 Sheets-Sheet 5

*INVENTOR.*
HANS M. FRIEDRICHSEN
*BY*
Kenway, Jenney, Witter & Hildreth
ATTORNEYS

*INVENTOR.*
HANS M. FRIEDRICHSEN

*BY*

Kenway, Jenney, Witter - Hildreth
ATTORNEYS

STENCIL-CHARACTER-FORMING APPARATUS

Filed Feb. 11, 1960 7 Sheets-Sheet 7

*INVENTOR.*
HANS M. FRIEDRICHSEN
*BY*
Kenway, Jenney, Witter & Hildreth
ATTORNEYS United States Patent Office 3,000,487

Patented Sept. 19, 1961

3,000,487
STENCIL-CHARACTER-FORMING APPARATUS

Hans M. Friedrichsen, Smyrna, Ga., assignor to Elliott Addressing Machine Company, Cambridge, Mass., a corporation of Delaware Filed Feb. 11, 1960, Ser. No. 8,126
20 Claims. (Cl. 197—130)

This invention relates to stencil-character-forming apparatus and more particularly to novel and improved apparatus for transferring record cards or the like from a supply station to character forming means, such as a typewriter, for printing or otherwise providing indicia on the record card, and then for effecting removal of the record card from the apparatus for deposit in a storage station, all in a timed relation and in semi- or fully automatic operation which eliminates manual handling of the cards between the supply and storage stations. Apparatus of this general type is described and claimed in United States Letters Patent No. 2,837,196, issued June 3, 1958, in the name of Harmon P. Elliott.

In the aforementioned patent, apparatus of the general type described is utilized in connection with stencils of a well known type comprising a relatively rigid cardboard frame, rectangular in configuration. A tissue portion, having a film or coating, is mounted on the frame, and it is on this tissue portion that stencil characters are formed such as by the type characters of a typewriter. The film coating of the tissue portion is preferably moistened prior to the character forming operation in order to condition the tissue portion for effectively receiving an impression when struck by a type character of a typewriter or the like. Accordingly, apparatus of the type of the aforementioned patent and of a type with which this invention is concerned includes means for suitably moistening the stencil and for effectively blotting each moistened stencil to remove excess water before it reaches the character forming elements of the apparatus.

Apparatus of the type described, and particularly that of the aforementioned patent, has proved to be satisfactory for the handling of relatively thick, rigid stencil frames of the type described. However, the card transfer and conveying elements of such apparatus are not adapted to handle thin, flexible card stock, such as used in tabulating cards utilized in automated accounting systems. Accordingly, it is the primary object of this invention to provide novel and improved stencil-character-forming apparatus particularly adapted to handle record cards made from thin, flexible card stock, such as tabulating cards, which cards may include a stencil tissue portion.

It is another object of the present invention to provide novel and improved apparatus for feeding tabulating cards and the like one at a time from a stack of such cards and for discretely advancing the tabulating cards, in spaced succession, from the supply stock to character imprinting apparatus.

It is another object of the present invention to provide novel and improved means for effecting removal of record cards and the like from the character imprinting station of character-forming apparatus of the general type described.

Other objects and advantages of the present invention will be in part apparent and in part will be pointed out more in detail hereinafter.

The invention, accordingly, resides in the features of construction, combination of elements, and arrangement of parts which will be exemplified in the construction hereinafter set forth, and the scope of application of which will be indicated in the appended claims.

It is believed that the following detailed description of the construction and arrangement of elements in a specific embodiment of the invention will be more readily understood if a brief description of the major portions and of the operation of the apparatus of the accompanying drawings is first presented. Accordingly, and with reference to FIG. 1, the apparatus shown therein generally comprises a card supply and feeding portion A wherein is located a stack B of tabulating cards each having a central tissue stencil portion J. The card supply and feeding portion also includes means for removing the lowermost card from the bottom of the stack and feeding or advancing it, in spaced apart relation to the preceding and successive cards, from the supply stack to a track C. During the feeding of the card from the stack to the track C the stencil portion of the card is suitably moistened and blotted. Means are provided to advance or transfer each card along the track C in a single continuous movement from the supply and card feeding portion A to the character forming portion D of the apparatus. The character forming portion D, in the specific embodiment, comprises an electric typewriter which is specially adapted with a card hold-down and ejecting portion E for holding the card against the platen E′ during forming of indicia on the card and for ejecting the card, after the character forming operation, into a hopper F at the rear of the machine. The motor drive for the apparatus is contained within the portion G at the left of the apparatus. The operation of the card feeding, card holding and card ejecting portions of the apparatus is controlled through a cam and drive shaft connected to the drive motor by a single revolution clutch, the actuation of which is effected by depression of a special pushbutton switch H on the typewriter.

Figure 1:
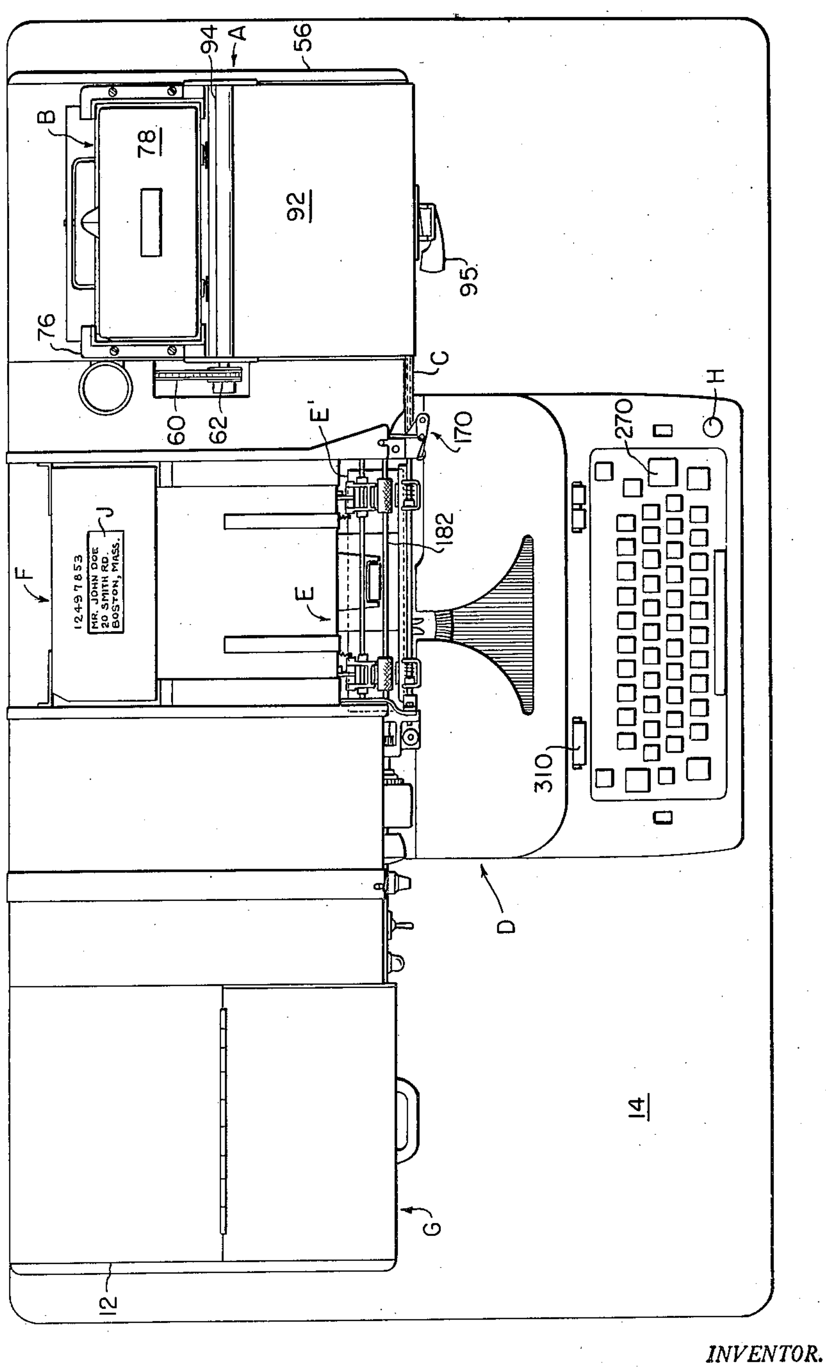
FIG. 1 is a top view of stencil-character-forming apparatus which is constructed in accordance with this invention and which is particularly adapted to process tabulating cards having a central tissue type stencil portion.

Briefly, the operation of the apparatus of FIG. 1 is as follows: the switch H is depressed to initiate operation of the card ejecting and feeding mechanism and to eject the card on the platen into the hopper F while at the same time, and in timed relation, a new card is fed along the track C and onto the platen. Also simultaneously and in timed relation with the aforedescribed feeding and ejecting operations, the lowermost card in the stack B will be removed therefrom and moved to a stencil moistening position, a previously removed card will be moved from the stencil moistening position to a stencil blotting position, and a still previously removed card will be moved from the stencil blotting position to the track C, where it is in position to be fed onto the platen during a succeeding cycle of operation.

Figure 2:
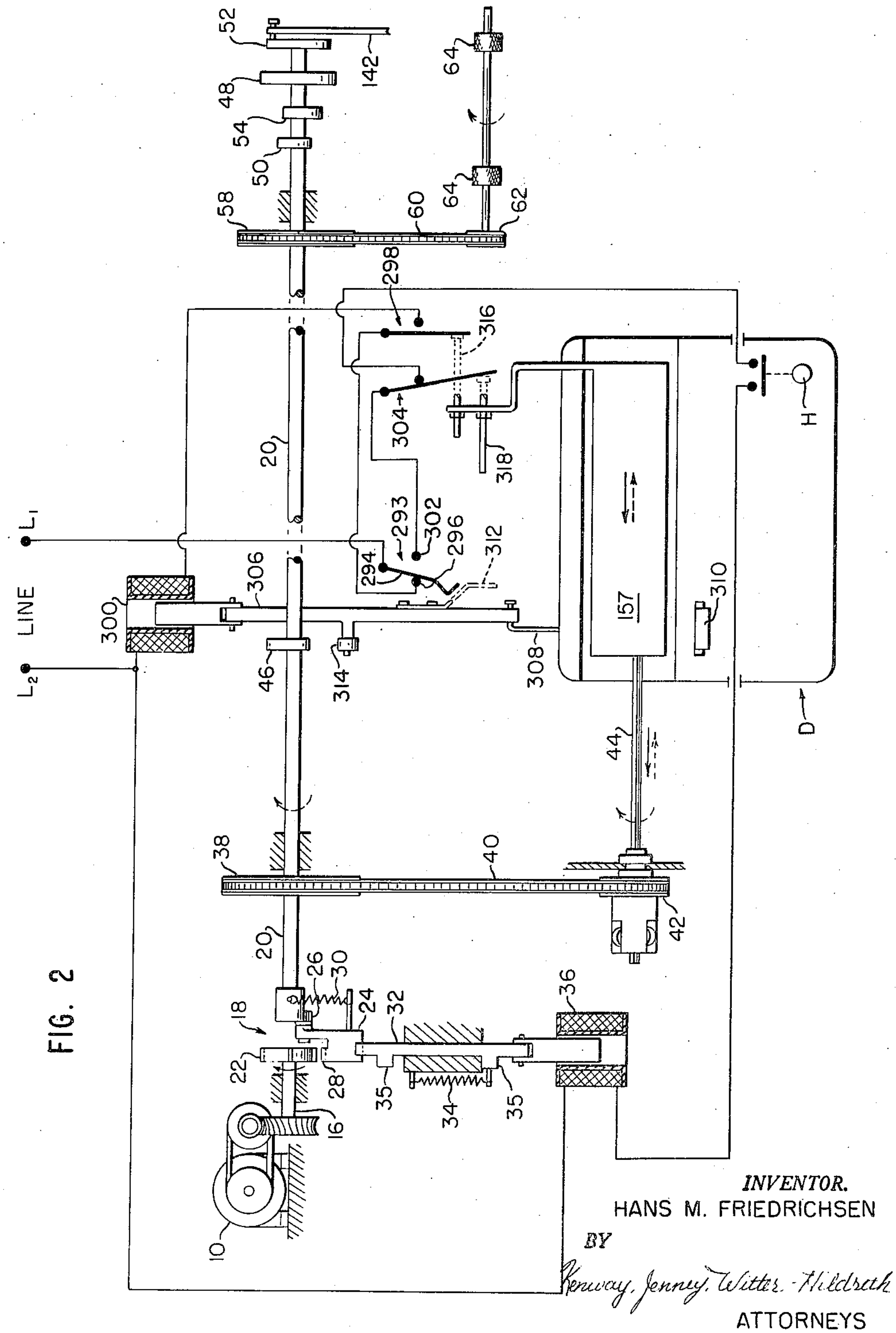
FIG. 2 is a diagrammatic view of the electrical and mechanical control elements of the apparatus of FIG. 1.

Turning now to a detailed description of the structure shown in the accompanying drawings, and with reference to FIGS. 1–4, an electric drive motor 10, shown in FIG. 2, is contained within the housing 12 at the left of the apparatus, as viewed in FIG. 1. The housing 12, as well as the rest of the apparatus, is supported on a table or the like 14. With specific reference to FIG. 2, the motor 10 is drivingly connected to a rotatable shaft 16 by suitable gearing and the like. The shaft 16 is connectible through a single revolution clutch 18 to a rotatable cam and drive shaft 20. The clutch 18 may be of any suitable type but in the specific embodiment shown comprises a four-tooth ratchet wheel 22 mounted for rotation with the shaft 16. The clutch further comprises a lever 24 pivotally mounted at one end on the outer end of an arm 26 extending radially from and rotatable with the cam and drive shaft 20. The lever 24 has a tooth 28 engageable with the ratchet wheel 22, in response to pivoting of the lever toward the wheel, so as to drivingly connect the shafts 16 and 20. A spring 30 biases the lever 24 toward the ratchet wheel. A slide 32 is interferingly engageable with the lever 24 to prevent engagement of the lever and ratchet wheel. A spring 34 urges the slide toward interference with the lever, and the slide is provided with a pair of stops 35 to limit movement thereof both toward and away from the lever 24. The slide is connected to the armature of a solenoid 36 whereupon energizing of the solenoid will draw the slide out of interference with the toothed lever 24 to permit the lever to be urged into engagement with the ratchet wheel 22 and drivingly connect the shafts 16 and 20. As will be later seen, the energizing of the solenoid 36 is only momentary so that before the lever 24 has made one complete revolution with the shaft 16, the slide 32 will have been urged back into interfering position relative to the lever 24. Therefore, as the shaft 20 completes one revolution, the slide will be engaged by the lever 24 to move the lever out of driven engagement with the ratchet wheel 22 and halt rotation of the shaft 20. Thus, it can be seen that for each energizing of the solenoid 36, there will be a single revolution of the shaft 20.

The shaft 20 mounts a sprocket 38 connected by a chain to a smaller diameter sprocket 42. The sprocket 42 is suitably connected to a shaft 44 to provide for rotation of the shaft 44 in response to rotation of the shaft 20 while at the same time to provide for sliding movement of the shaft 44 relative to the sprocket 42 and in a direction longitudinally of the shaft 44. The shaft 44 is connected to the card holding and ejecting mechanism E, which will be described in detail hereinafter.

Figure 3:
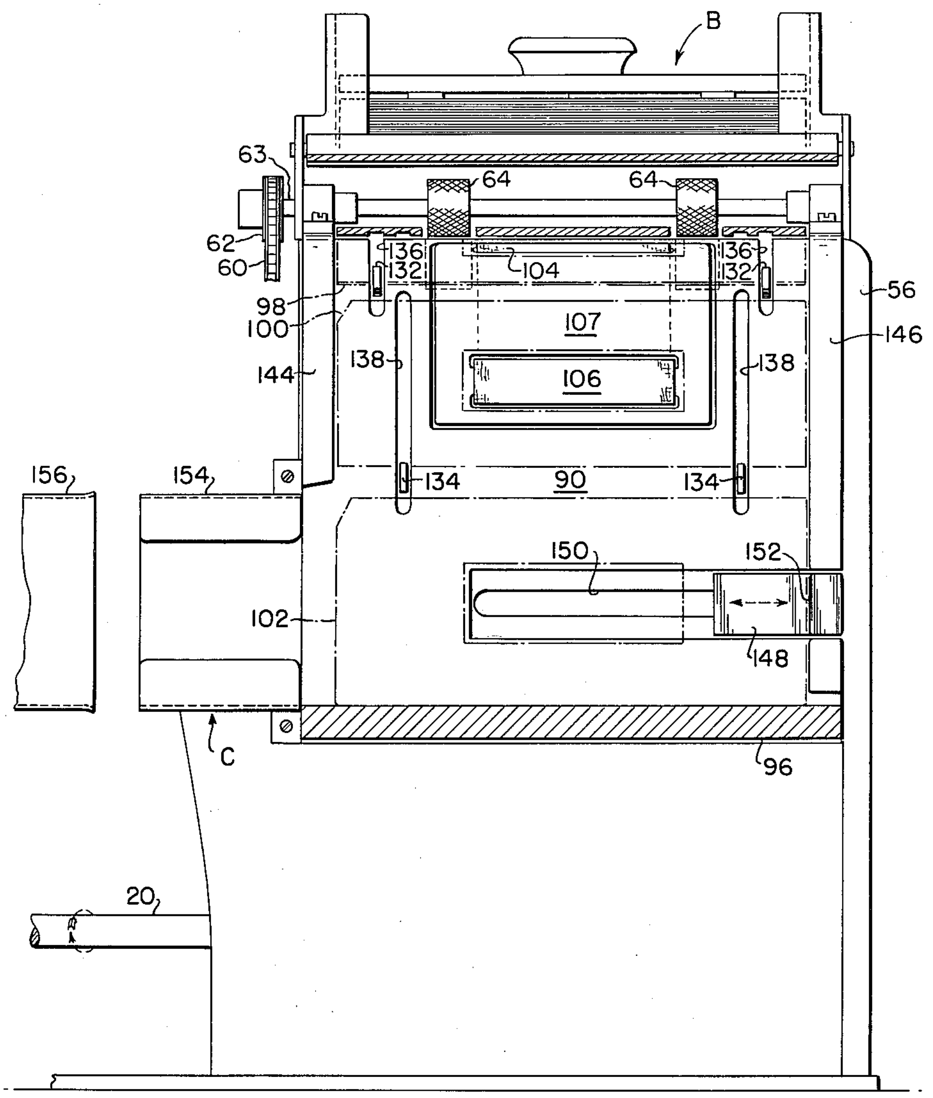
FIG. 3 is an enlarged front elevational view, with the cover removed, of the supply station and card feeding and stencil moistening and blotting portion of the apparatus of FIG. 1.

Also mounted on the shaft 20 for rotation therewith are a plurality of cams 46, 48, 50, 52, and 54. The cam 46 is associated with mechanism, to be later described, which provides for moving of the ink ribbon of the typewriter out of operative position when it is desired to cut a stencil and also is associated with the control switch of the apparatus, in a manner to be described. The remaining cams are concerned with the feeding of the cards from the stack B to the track C, with feeding the cards along the track C, and with the pre-moistening and blotting of the stencils. These cams are located within a housing 56 at the right of the apparatus as viewed in FIG. 1. Also mounted for rotation with the shaft 20 is a sprocket 58, which, as shown in FIG. 2, is connected by a chain 60 to a smaller diameter sprocket 62. The sprocket 62 is drivingly connected to a shaft 63, which, as shown in FIG. 3, is rotatably supported by the housing 56. A pair of card engageable drive rolls 64 are mounted on the shaft 63 for rotation therewith. The function of the rolls 63 will be made apparent hereinafter.

Figure 4:
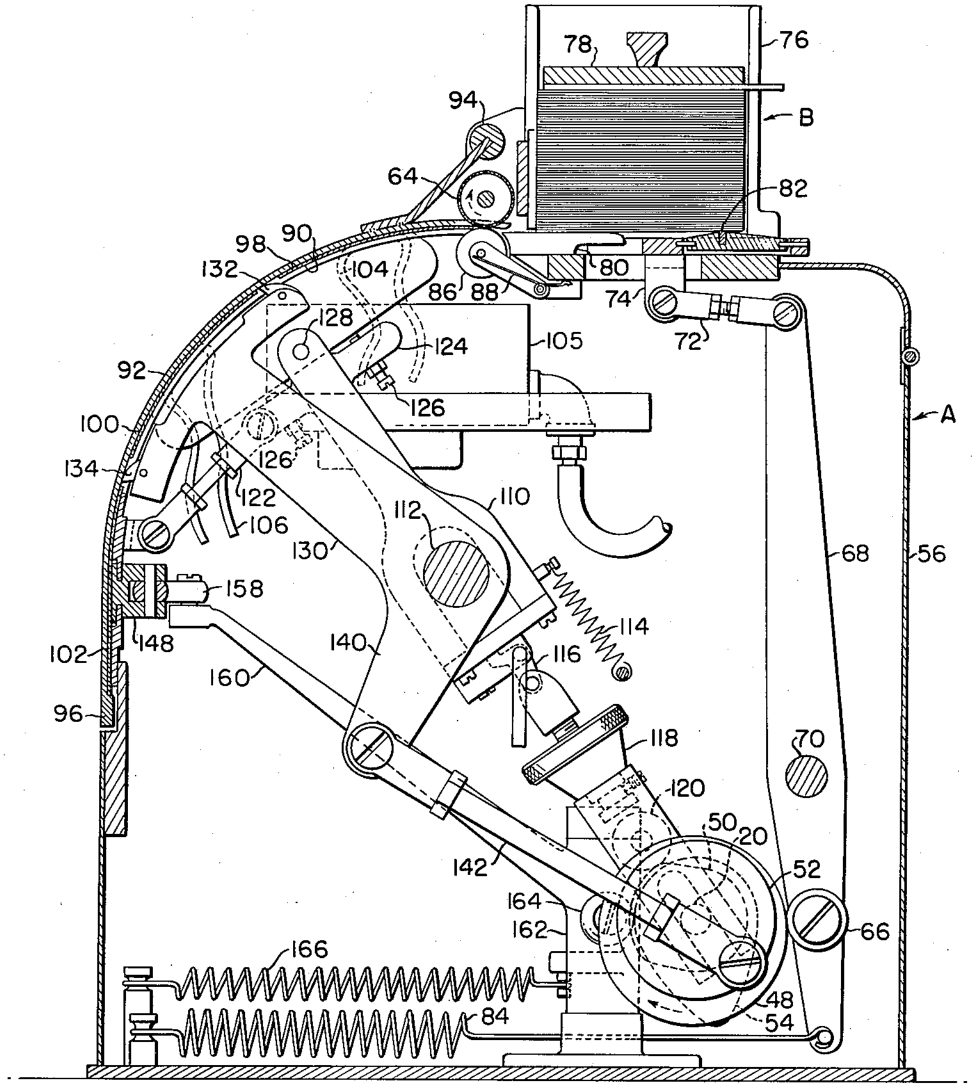
FIG. 4 is an enlarged side elevational view of the supply station, card feeding, and stencil moistening and blotting portion of the apparatus of FIG. 1.

With particular reference to FIGS. 3 and 4, the cam 48 on the shaft 20 is, in the specific embodiment shown, an eccentrically mounted disc, the periphery of which is engageable with a cam follower 66 carried by one end of a rocker arm 68. The rocker arm is mounted intermediate its ends on a pivot 70, and the arm extends vertically relative to the housing 56 and generally at right angles to the shaft 20. The upper end of the rocker arm 68 is pivotally connected to one end of an adjustable link 72. The other end of the link 72 is pivotally connected to a slide 74 which is movable laterally of and across the bottom of a hopper 76 containing the stack B of tabulating cards. A weight 78 is placed on top of the stack to hold the lowermost card firmly and flat against a shelf or table 80 at the top of the housing 56. The slide 74 moves in a slot or the like in the shelf 80 and at right angles toward and away from the axis of the drive rolls 64 which are located in front of the hopper 76.

The slide is provided with an insert 82 which projects above the top surface of the slide an amount less than the thickness of one of the tabulating cards. The insert 82 thus forms a shoulder on the slide which is engageable with the rightward edge, as viewed in FIG. 4, of the lowermost card in the stack B when the slide is moved to the right and then to the left, as viewed in FIG. 4, under the control of the cam 48. More specifically, as the cam 48 is rotated in a clockwise direction from its rest position as shown in FIG. 4, the slide will be moved to the right and beyond the rear edge of the lowermost card in the stack and then the slide will be moved to the left, whereupon the slide will move the lowermost card edgewise to the left and into engagement with the drive rolls 64. A spring 84 urges the rocker arm 68 in a clockwise direction to bias the cam follower 66 into cam engagement and also to bias the slide 74 in a rightward direction, as viewed in FIG. 4.

As the lowermost card is moved to the left by the slide 74, it is frictionally engaged between the drive rolls 64 and a matching pair of idler rolls 86, only one of which is shown. As shown in FIG. 4, the idler rolls are pivotally supported for movement toward and away from the drive rolls. A spring 88 biases the idler rolls toward the drive rolls so as to provide a firm frictional driving engagement between a card and the drive rolls. The housing 56 is provided with a card supporting surface 90 extending from next adjacent the drive roll 64 and curving downwardly about the front of the housing. The housing is further provided with a cover 92 extending over the card supporting surface 90 and spaced therefrom to permit the passage of cards therebetween. The cover is hinged adjacent its upper edge as at 94. The cover is further provided along its lower edge with an inwardly extending lip 96. As most clearly shown in FIG. 3, the upper edge surface of the lip 96 provides a card supporting surface forming a portion or element of the track C. As shown in FIG. 1, a latch 95 is provided in the cover to lock the same in closed position.

With reference to FIG. 4, as the lowermost card of the stack B is removed by the slide 74, the card will be engaged between the drive rolls 64 and idler rolls 86 to propel the card between the cover 92 and card supporting surface 90 and into a stencil moistening position exemplified by the card 98 of FIGS. 3 and 4. The movement of the card by the drive rolls 64 will cease when the card has cleared the drive rolls, the halting of card movement being further assisted by frictional engagement between the card and overlying card supporting surface 90 and the cover 92. Suitable means, to be hereinafter described, are provided to move the card from the stencil moistening position downwardly over the card supporting surface 90 to a stencil blotting position exemplified in FIGS. 3 and 4 by the card 100. Also, suitable means, to be described, are provided to move the card from the stencil blotting position 100 downwardly and over the card supporting surface 90 and into engagement with the upper edge of the lip 96 on the cover, as shown by the position of the card 102 in FIGS. 3 and 4.

To provide for the stencil moistening and blotting operations desired when the cards are in the positions 98 and 100, there are provided a pair of wicks 104 and 106, respectively, for moistening and blotting the stencils. As most clearly shown in FIG. 3, the wicks are carried by a curved plate-like member 107 which is registrable within a cut-out or window 108 in the card supporting surface 90. As shown in FIG. 4, the ends of the moistening wick 104 extend into a tank 105 which is adapted to contain a quantity of suitable liquid which may be supplied to the tank from a remote source. The wick supporting member 107 is supported at its ends by a pair of arms 110, only one of which is shown. The outer ends of the arms 110 are bifurcated and slidably embrace a horizontal shaft 112 supported on the frame of the housing 56. A spring 114 urges each of the arms 110 and thus the wick-carrying plate 107 away from the window 108 in the card supporting surface 90 so as to urge the wicks out of card engagement. The outer ends of the arms 110 are connected by a toggle connection 116 to a cam follower 118 having a roller 120 which is engageable with the periphery of the cam 50 on the shaft 20. As can be seen in FIG. 4, the lower end of the cam follower 118 is bifurcated and slidably embraces the cam shaft 20. Accordingly, as the cam 50 is rotated with the shaft 20, the cam follower 118 and arms 110 and wick-carrying plate member 107 will be moved toward and away from the card supporting surface 90. In order to guide the movement of the plate member 107, there is provided in association with each arm 110 an adjustable toggle link 122 pivotally connected at one end to the housing 56 and at the other end to a levelling plate 124 mounted for movement with the arm 110. Each levelling plate 124 carries a pair of levelling screws 126 disposed on opposite sides of the pivotal connection 128 of the plate 107 to the arm 110. As will be apparent from FIG. 4, adjustment of the levelling screws 126 serves to accurately position the wick-carrying plate 107 relative to the window 108 when the plate 107 is in the stencil-moistening and blotting position of FIG. 4.

In order to move the cards along the card supporting surface 90 from the driving rolls 64 to the track C, there is provided a pair of bell cranks 130, only one of which is shown in FIG. 4, which are pivotally mounted on the shaft 112 adjacent the opposite edges respectively of the card supporting surface 90. Each of the bell cranks 130 carries at its outer end a pair of spring biased fingers or dogs 132 and 134. As can be seen in FIG. 3, the fingers 132 and 134 project through elongated slots 136 and 138, respectively, in the card supporting surface 90, which slots extend in the direction of card movement along the surface 90. The fingers 132, 134 are each provided with a curved rear surface facing generally in the direction opposite the direction of card movement and are further provided with a forwardly facing shoulder extending generally at right angles to the card supporting surface 90 and facing in the direction of card movement along the surface 90. The card engaging fingers are pivoted on the bell cranks and are biased in a direction outwardly of the surface 90. The other arms 140 of the bell cranks are pivotally connected to a link 142 which is pivotally connected at its other end to the cam 52, which is a circular disc mounted on the shaft 20. The arm 142 is connected to the disc 52 at a point spaced from the center of the disc to provide a crank connection to the shaft 20, whereby rotation of the shaft 20 will result in rocking of the bell cranks 130 first in a clockwise direction, as viewed in FIG. 4, and then in a counterclockwise direction; and finally a slight amount of clockwise movement will be imparted to the bell cranks before the disc comes to its rest position shown in FIG. 4.

As the bell cranks are moved in a clockwise direction, the lower edges of the cards 98, 100 will cam the fingers 132, 134 inwardly, whereupon the fingers will ride along the undersurface of the cards until they clear the upper edges thereof. Once the fingers have cleared the upper edges of the cards 98 and 100, the fingers will spring upwardly so that the forwardly facing surfaces thereof are in engaging position relative to the upper edges of the cards 98 and 100. Subsequent counterclockwise movement of the bell cranks will effect engagement of the cards 98 and 100 by the fingers 132 and 134, respectively, and the cards will be moved a distance greater than the width of a card to move the card 98 to the position previously occupied by the card 100 and to move the card 100 to the position previously occupied by the card 102. The card 102 will have previously been moved along the track C by means to be hereinafter described. It is preferred that once the cards have been moved to the next succeeding position the bell cranks be backed off slightly in a counterclockwise direction so as to disengage the fingers 134 from the card engaged on the track C so that the fingers will not provide any restraint of movement of the card along the track. In order to guide the cards during their movement along the card supporting surface 90, a pair of rail members 144, 146 are, as shown in FIG. 3, provided along the outer edges respectively of the card supporting surface 90. The ends of the cards are engageable with these rails to center the cards relative to the surface 90.

With reference to FIGS. 3 and 4, the means for advancing a card along the track C comprises a slide 148 extending through a slot 150 in the card supporting surface 90. The slot 150 extends parallel to the track C, and the slide 148 is slidably guided for movement in opposite directions parallel to the direction of the track C. The slide is provided with a shoulder 152, best shown in FIG. 3, which is engageable with an end of the card 102 to move the card endwise to the left as viewed in FIG. 3, whereupon the card will be moved along the card supporting surface of the lip 96 on the cover 92 and into guiding engagement with a track member or element 154 which is aligned with the upper surface of the shoulder or lip 96 on the cover. As further shown in FIG. 3, the track member 154 is aligned with but spaced from the next adjacent end of another track member or element 156 mounted on the carriage 157 and which, as will later be seen, guides the cards onto the platen of the associated typewriter. As most clearly seen in FIG. 6, the front wall of the track element 156 has a central window through which the type characters of the typewriter may pass into engagement with a card supported on the platen.

As shown in FIG. 4, the slide 148 is pivotally connected to one end of a link 158, the other end of which is pivotally connected to the outer end of an arm 160 extending from an oscillatable vertically extending post 162. The post 162 carries a cam follower in the form of a roller 164 which is engageable with the periphery of the cam 54 mounted on the shaft 50. A spring 166 biases the post 162 in a direction corresponding to movement of the slide 148 to the right as viewed in FIG. 3. As will further be apparent from FIG. 4, rotation of the cam 54 one complete revolution from its rest position will result in the slide 148 being moved to the left and then to the right. As should be apparent from a consideration of FIG. 4, the reciprocation of the slide 148 will occur during the first approximately 180 degrees of rotation of the cam 54. Further, the retraction of the bell cranks 130 and card engageable fingers 132 and 134 will occur during the first approximately 180 degrees of rotation of the disc or cam 52.

Accordingly, before any downward feeding movement of the cards occurs, the lowest card which is disposed on the track C will have been moved along the track and the slide 148 will have been retracted so that the card 100 may be fed onto the track C without interference with the card 102. Further, the cam 50 will effect movement of the wick-carrying plate 107 away from the card supporting surface 90 prior to the first 180 degrees of travel of the cam and will not return the wicks into card engagement until final movement of the cam into its rest position of FIG. 4. Accordingly, during advance of the cards 98 and 100 along the surface 90, the wicks will be out of engagement therewith so as not to interfere with card movement. Also, as should be apparent from FIG. 4, the control of the rocker arm 68 by the cam 48 is such that the slide 74 will be in card engaging position and moving to the left as viewed in FIG. 4 at the time or subsequent to the time when the fingers 132 have become engaged with the card 98 and are moving the same downwardly along the surface 90. The driving rolls 64 will, of course, be rotating so long as the shaft 20 is in driven connection with the shaft 16 so that as the lowermost card in the stack B is fed into engagement with the drive roll 64 by the slide 74 the card will be propelled by the driving roll into the stencil moistening position occupied by the card 98 shown in FIG. 4. Accordingly, it can be seen that the various transfer operations heretofore described as well as the stencil moistening and blotting operations are under the control of the various cams mounted on the shaft 20 which are arranged in angularly timed relation to each other to provide the desired sequence and cycle of operation during a single rotation of the cam shaft 20.

Figure 5:
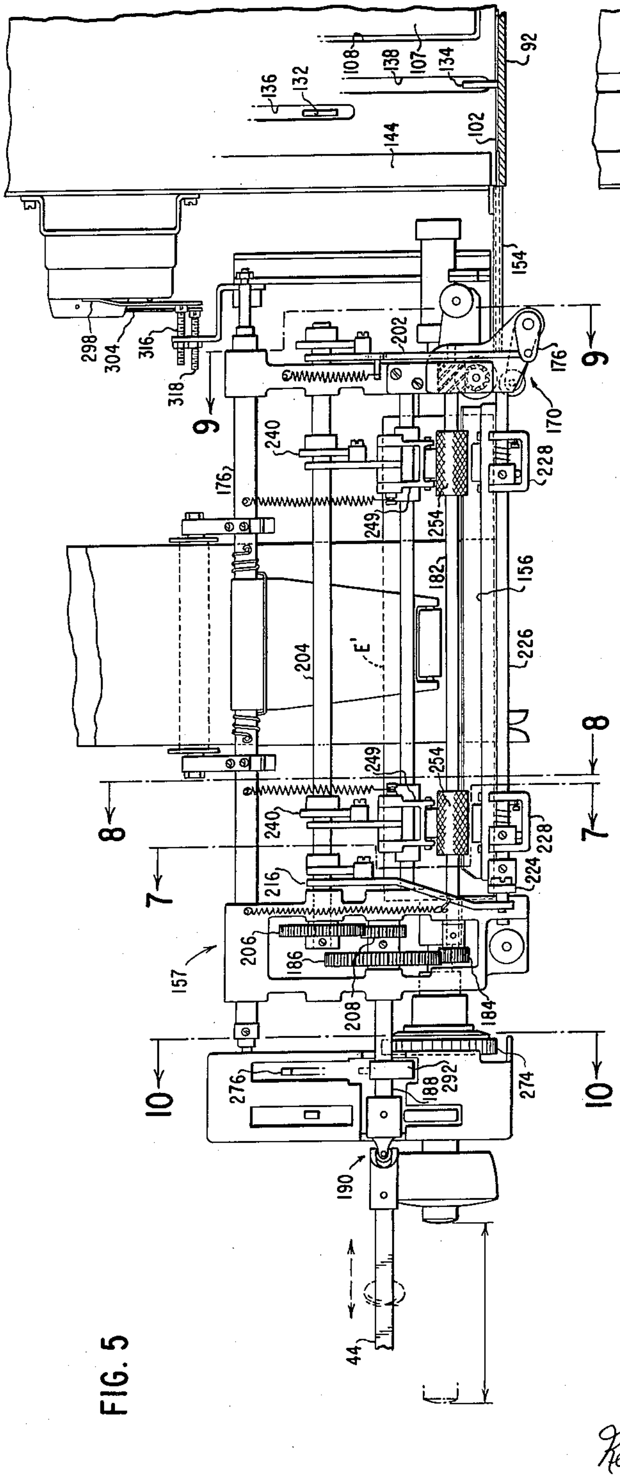
FIG. 5 is an enlarged top view of the stencil and/or card printing and card ejecting portion of the apparatus of FIG. 1.
Figure 6:
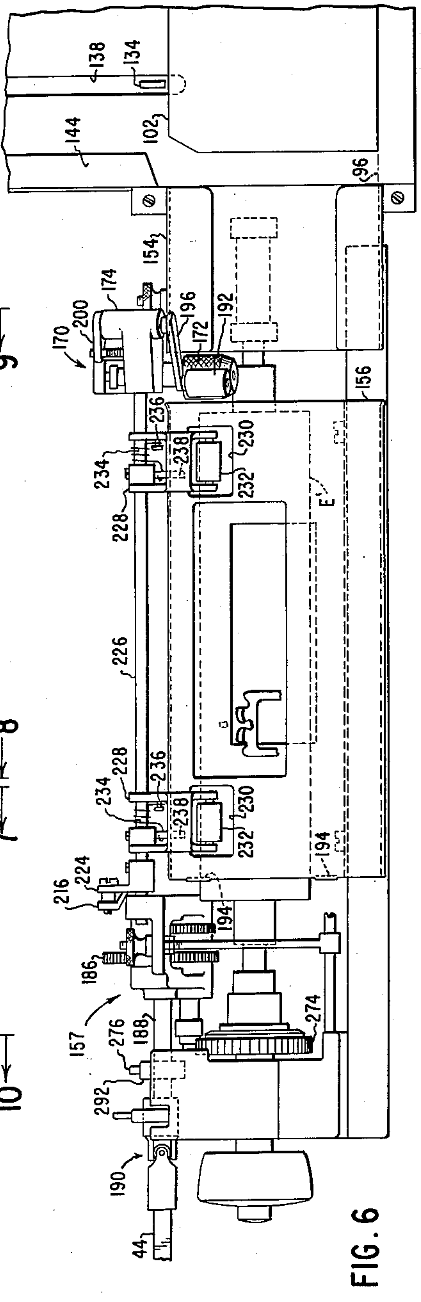
FIG. 6 is an enlarged front elevational view of the stencil and/or card printing and card ejecting portion of the apparatus of FIG. 1.
Figure 7:
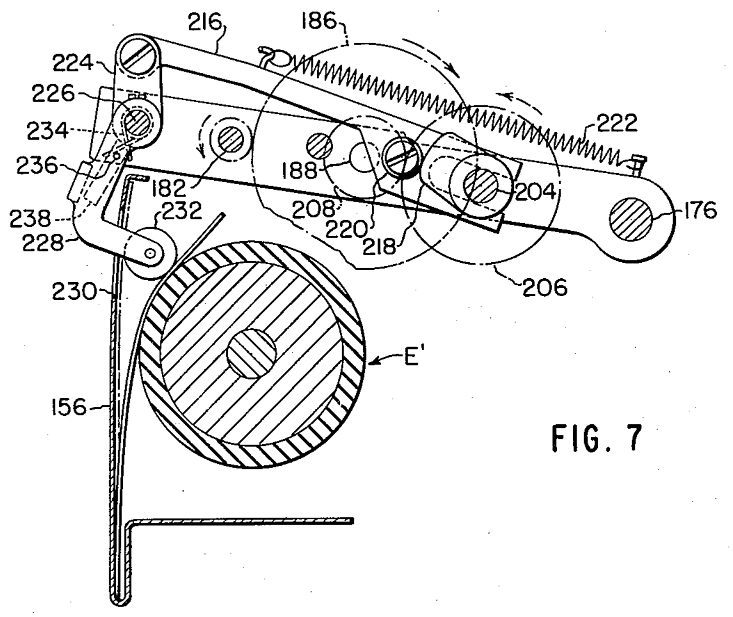
FIG. 7 is an enlarged sectional view substantially along the line 7—7 of FIG. 5.
Figure 8:
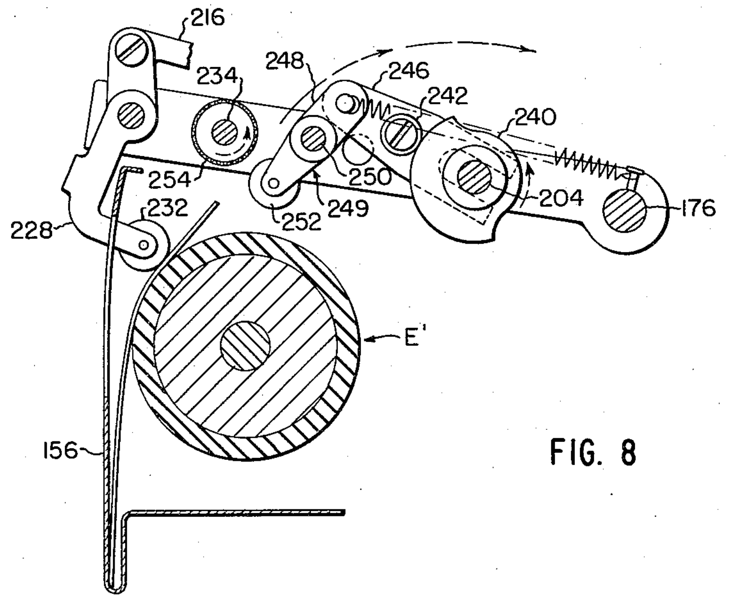
FIG. 8 is an enlarged sectional view substantially along the line 8—8 of FIG. 5.
Figure 9:
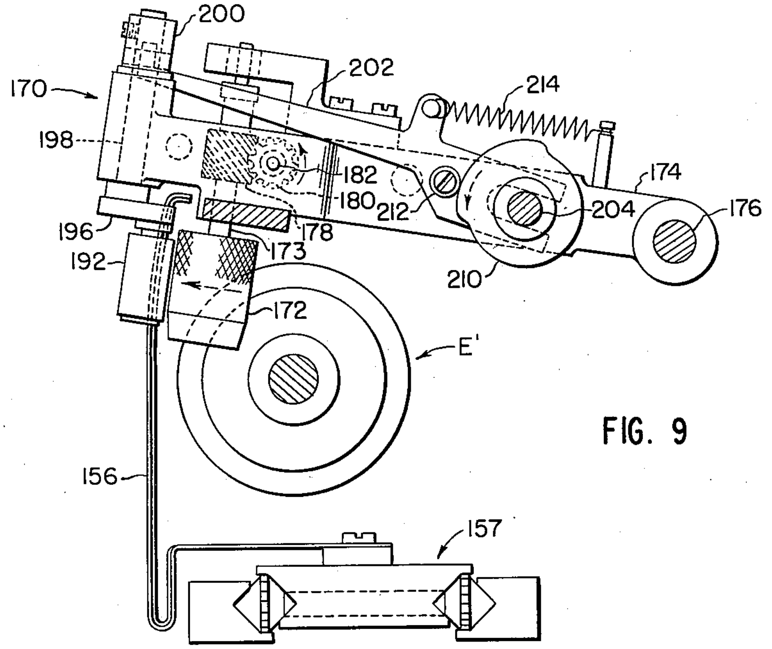
FIG. 9 is an enlarged sectional view substantially along the line 9—9 of FIG. 5.

With particular reference to FIGS. 1 and 5 to 9, the card holding and ejecting portion E of the apparatus of this invention comprises a card advancing mechanism 170 including a card engageable driving roll 172 which, as best shown in FIG. 6, is disposed between the spaced apart ends of the track elements 154 and 156. With particular reference to FIG. 9, the drive roll 172 is mounted on a rotatable shaft 173 supported on an arm 174 adjacent the outer end of the arm. The inner end of the arm 174 is mounted on a fixed shaft 176 mounted on the carriage 157 of the typewriter D. The shaft 173 has a gear 178 mounted thereon which is engageable with a drive gear 180 mounted on a shaft 182 extending parallel to the platen E and journalled in part on the arm 174. The shaft 182, as best shown in FIG. 5, is connected at its leftward end to a pinion 184 engaged with a gear 186. The gear 186 is, in turn, mounted for rotation with a shaft 188 connected through a universal coupling 190 to the shaft 44 previously described. Accordingly, rotation of the shaft 44 will result in rotation of the shaft 182 and thus the drive roller 172. Further, as will be most clearly seen in FIG. 9, the track element 156 will support the lower edge of a card, with the card extending generally tangentially of the platen E'. The drive roller 172 extends generally vertically and next adjacent the track element 156 whereby it is in position for engagement with a card as the card is fed by the slide 148, previously described, beyond the track element 154. A pressure roll 192 is provided to urge the card into engagement with the drive roll 172 whereby the card will be propelled by the drive roller into the track element 146 and against a pair of stops 194, which, as shown in FIG. 6, are disposed at the leftward end of the track element 156.

With reference to FIGS. 5, 6 and 9, the pressure roll 192 is rotatably mounted on the outer end of an arm 196, the inner end of which is connected to a shaft 198 pivotally supported by the arm 174. The other end of the shaft 198 is connected to one end of an arm 200, the other end of which is connected to one end of a reciprocable lever or arm 202. The other end of the arm 202 is bifurcated and slidably embraces a rotatable shaft 204 extending parallel to the platen E' and journalled in part on the arm 174. As most clearly seen in FIG. 5, the shaft 204 is connected at its leftward end to a gear 206 which is engaged with a pinion 208 mounted for rotation with the shaft 188, previously described. Referring back to FIG. 9, a cam 210 is mounted on the shaft 204 and is engageable with a follower 212 on the reciprocable arm 202 to effect reciprocation of the arm generally radially of the shaft 204. A spring 214 urges the arm 202 into cam engagement and toward the shaft 204. Accordingly, it can be seen that as the cam 210 is rotated the pressure roll 192 will be moved toward and away from the drive roll 172. The cam 210 is contoured and angularly positioned on the shaft 204 such that during initial movement of the cam the pressure roll 192 will be spaced from the drive roll 172. However, after a predetermined rotation of the cam corresponding in time to the movement of a card by the slide 148 into registry with the drive roll 172, the pressure roll 192 will be urged into card engagement by the spring 214 to bring the card into driving engagement by the drive roll 172, whereupon the card will be propelled into the track element 156 and against the stops 194.

With reference to FIGS. 1 and 5 to 7, and particularly FIG. 7, there will now be described the means for holding the card in the track element 156 against the platen E'. The hold-down means comprises an arm 216 which, as shown in FIG. 5, is disposed at the leftward end of the carriage. One end of the arm 216 is bifurcated and slidably embraces the shaft 204, on which is mounted for rotation therewith a cam 218. The cam is engageable with a cam follower 220 on the arm 216. A spring 222 biases the arm 216 toward the shaft 204 and thus into cam engagement. The outer end of the arm 216 is pivotally connected to an arm 224, which, as shown in FIGS. 6 and 7, is mounted for rotation with a shaft 226 extending parallel to the platen E' and generally along the top of the track element 156. Spaced along the shaft 226 and pivotally supported thereon are a pair of roller supports 228. The roller supports are disposed on the side of the track element 156 opposite the platen E' and project through windows 230 in the track element. The portion of each roller support projecting through the track element 156 carries a rotatable pressure roll 232 extending parallel to the platen E'. Each roller support is drivingly connected to the shaft 226 by a torsion coil spring 234 arranged about the shaft. One end of each spring 234 is engaged with a pin or projection 236 on the roller support, while the other end of the spring is engaged with an arm 238 extending radially from and fixed for movement with the shaft 226. The springs 234 are initially prestressed to provide a resilient driving connection between the shaft 226 and the roller supports. Accordingly, and with particular reference to FIG. 7, after the cam 218 has been rotated a predetermined amount in a counterclockwise direction as viewed in FIG. 7, the arm 218 will be permitted to be moved by the spring 222 in a rearward direction to pivot the shaft 226 in a clockwise direction as viewed in FIG. 7 so as to move the rollers 232 away from the platen E', thus retracting the hold-down means. Correspondingly, as the cam 218 completes a revolution, the arm 216 will be moved forwardly to pivot the rollers 232 toward the platen E' to press a card disposed between the roller and platen into engagement with the platen. As should be apparent from FIG. 7, during all but a relatively small initial movement of the cam 218 out of the rest position shown in FIG. 7, the pressure rolls 232 will be spaced outwardly from the platen E' so as not to interfere with the feeding of a succeeding card onto the platen and also so as not to interfere with the ejection operation later to be described. On the other hand, as will be apparent from FIG. 7, so long as the cam 218 is in the rest position, the pressure rolls 232 will serve to hold a card against the platen E' and thus in position for receiving indicia from the type mechanism of the associated typewriter.

With reference to FIGS. 1, 5, 6 and 8, and particularly FIG. 8, the card ejection mechanism of the apparatus of this invention will now be described. The ejection mechanism comprises a pair of cams 240 which, as shown in FIG. 5, are spaced apart along the shaft 204 and are mounted for rotation therewith. As most clearly shown in FIG. 7, each of the cams 240 is engageable with a cam follower 242 carried by an arm 246, one end of which is bifurcated and slidably embraces the shaft 204. The other end of the arm 246 is pivotally connected to an arm 248 of a roller support 249 associated with each of the cams. Each of the roller supports 249 is pivotally mounted on the shaft 250 and carries a pressure roller 252 extending parallel to the platen E'. Each of the pressure rolls 252 is operatively associated with an ejection drive roll 254 which is mounted for rotation with the shaft 234. As will be apparent from FIG. 8, the pressure roll 252 is normally spaced from the ejection roll 254. Further, as can be seen from FIG. 8, the hold-down rolls 232 are disposed substantially above the center line of the platen E' so that the upper portion of a card engaged on the platen by the hold-down rolls will extend in a direction upwardly and rearwardly of the platen and the card will be advanced in that direction as the angularly indexable platen is rotated during the typing operation. As can be seen in FIG. 8, each drive roll 254 and associated pressure roll 252 are spaced apart on opposite sides of the normal path of movement of a card by the platen as the platen is rotated. Accordingly, after the platen has been angularly indexed several times, the upper edge of a card engaged thereon will be disposed between the ejection rolls 254 and associated pressure rolls 252. With a card in such a position, and with the cam 240 being rotated in a counterclockwise direction as viewed in FIG. 8, the pressure roll 252 will be urged toward the ejection roll 254 to drivingly engage the card and ejection roll, whereupon the card will be propelled upwardly and rearwardly of the machine and into the hopper F shown in FIG. 1. As will be apparent from a consideration of FIGS. 7 and 8, the actuation of the ejection mechanism takes place at approximately the same time that the hold-down rolls 232 are moved out of card engagement so as to assure that the cards will be properly held on the platen until the ejection rolls are in card engagement while at the same time insuring that the hold-down rolls will not interfere with ejection of the card. As will be apparent from a consideration of FIGS. 8 and 9, the pressure roll 192 associated with drive roll 172 for advancing a card along the track element 156 will not be brought into card engagement until after the ejection mechanism has become operative to remove a card from the machine. In this manner it is assured that a card on the platen will be removed therefrom prior to the advance of another card into the track element 156.

Figure 10:
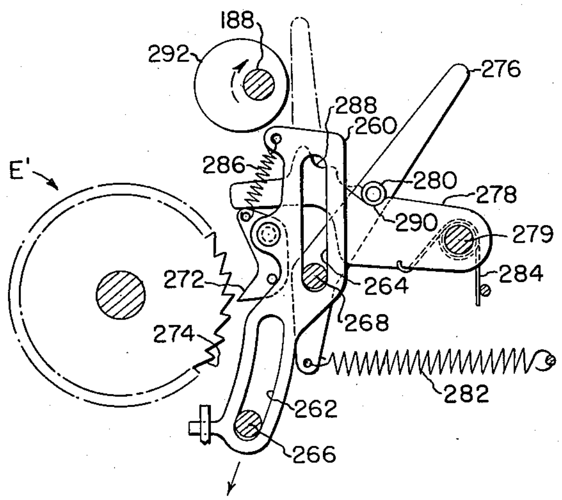
FIG. 10 is an enlarged sectional view substantially along the line 10—10 of FIG. 5.

With reference to FIG. 1, and as shown in the top card in the hopper F, it may be desired to provide typed indicia on the card above the stencil portion J and also to provide cutting of the stencil. In this connection, it is desirable that the indicia on the card proper be spaced from the top line of indicia on the stencil a distance greater than the spacing of the lines on the stencil. While this unequal line spacing may be particularly desirable in the situation of a stencil bearing tabulating card, it may also be desirable in the case of a tabulating card or any other record card which does not have a stencil portion. In accordance with the desire to automate the operation of the apparatus of this invention as much as possible, there has been provided, as shown in FIG. 10, means for automatically providing the unequal line spacing just described. While this function might be accomplished in a variety of ways, as will be apparent to those skilled in the art, this function is accomplished in the specific embodiment shown in FIG. 10 by utilizing the conventional platen angular advance mechanism of the typewriter which has been modified to provide the automatic features desired. The platen advance mechanism comprises a plate member or pawl carrier 260 extending vertically relative to the platen E' and provided at its lower end with an elongated curved slot 262 and at its upper end with an elongated vertically extending linear slot 264. A pair of fixed pins or shafts 266 and 268 extend through the slots 262 and 264, respectively, and are slidably engaged with the bordering edge portions of the slots. Conventional means on the typewriter are engageable with the lower end of the pawl carrier 260 to move the pawl carrier in a downward direction and then urge the same in an upward direction each time the carriage return key, shown in FIG. 1 at 270, is depressed.

The pawl carrier pivotally mounts a pawl 272 which is engageable with a ratchet wheel 274 on one end of the platen E' to advance the platen each time the pawl carrier is moved downwardly. The extent of angular movement of the platen E' is determined in a conventional manner by a line spacing control lever 276 in cooperation with a lever 278 having a fixed pivot 279 at one end. More specifically, the line spacing control lever 276 is pivoted intermediate its ends on the shaft 268. The lever 276 is provided with a roller or the like 280 disposed intermediate the upper end of the lever and the pivot 268. An additional spring 282 has been added to bias the lever 276 in a counterclockwise direction as viewed in FIG. 10. The spring 282 urges the roller 280 into engagement with the upper edge of the lever 278, which is contoured to provide a plurality of notches corresponding to the desired line spacing. As will be apparent from FIG. 10, the outer end of the lever 278 extends over and is engageable with the upper end of the pawl 272 for a purpose to be described. A torsion spring 284 biases the lever 278 in a clockwise direction, as viewed in FIG. 10, thus urging the upper edge of the lever 278 toward the roller 280. The outer end of the lever 278 extends over and engages the upper end of the pawl 272 so that when the pawl carrier is in the rest position shown in FIG. 10 the pawl will be maintained in a counterclockwise-rotated, inoperative position by the lever 278. As is conventional, a spring 286 urges the pawl toward the ratchet wheel 274. The pawl carrier is biased in an upward direction to maintain the pawl and lever 278 in engagement by means (not shown) which are conventional in the usual typewriter and are well known to those skilled in the art.

The platen indexing and line spacing mechanism thus far described is of a conventional type with the exception of the spring 282. As will be apparent from FIG. 10, movement of the line spacing control lever 276 in a counterclockwise direction will result in the roller 280 being engaged with the upper edge of the lever 278 at a point spaced further from the pivot 278, whereupon the lever 278 will be moved in a counterclockwise direction. Through the engagement of the lever 278 and pawl 272, the pawl carrier 260 will be moved downward an amount corresponding to the angular movement of the lever 276. The upper end of the slot 264 in the pawl carrier will thus be spaced a lesser distance from the pin or shaft 268, and, accordingly, movement of the pawl carrier in a downward direction will be limited to this lesser spacing rather than to the full length of the slot. From the above, it may be understood that the outer notch 288 on the lever 278 corresponds to a single space advance of the platen, while the rearward shoulder 290 on the control lever 278 corresponds to a triple spacing. Normally, a notch would be provided between the notch 288 and shoulder 290 to correspond to a double spacing. However, in accordance with this invention, the promontory forming the rear edge of the intermediate notch as well as the forward edge of the rearward notch has been removed or at least reduced substantially in height. It should be noted that the lever 276 is urged in a counterclockwise direction by the spring 282, thus tending to move the lever out of the triple spacing position shown in full line and toward the single space position shown in dotted line. However, the lever 276 is resiliently maintained in the triple line position as a result of the bias of the lever 278 in a clockwise direction by the spring 284 and also by reason of the resilient engagement of the lever 278 and pawl 272. Upon actuation of the platen indexing mechanism, the pawl carrier 260 will be moved downwardly as heretofore described, resulting in the pawl 272 clearing the lever 278 and substantially reducing the bias force thereon. The action of the spring 282 is stronger than the action of the spring 284, so that once the pawl has cleared the lever 278 the lever 276 will be urged in a clockwise direction to engage the roller 280 in the notch 288, whereupon the line spacing mechanism is now conditioned for single line spacing.

In order to reset the line spacing mechanism to a triple line condition, a cam 292 in the form of an eccentrically mounted disc is mounted for rotation with the shaft 188, as shown in FIGS. 5, 6 and 10. The cam 292 is operable to move the lever 276 in a clockwise direction and out of the notch 288 in response to initial rotation of the shaft 188. The cam 292 will hold the lever 276 in a clockwise rotated position and clear of the notch 288, at least until the pawl carrier 260 has moved upwardly an amount sufficient for the pawl to engage the lever 278, whereupon the added bias to the lever 278 will cause the roller 280 to be cammed rearwardly and into engagement with the shoulder 290 so that the control lever 276 has now been reset to the triple line position shown in full lines in FIG. 10. Thus, it can be seen that after a card has been located in the track element 156, the first time the carriage return key 270 is depressed the platen will be advanced an amount corresponding to three line spaces. Subsequent advances of the platen will correspond to a single line spacing until such time as the shaft 188 is revolved a single revolution. As should be apparent from the above, during this single revolution of the shaft 188 the card on the platen E' will be ejected and a new card inserted, and during this card transfer operation the line spacing mechanism will be reset to triple line spacing in preparation for the typing operation on the next card.

With reference to FIG. 2, the electrical control circuit for the card transfer and other associated apparatus described above comprises a pair of power supply lines $L_1$ and $L_2$ adapted to be selectively connected by a suitable switching means (not shown) to a source of electrical power. The line $L_1$ is connected to the movable contact 294 of a single pole, double throw switch 293. The contact 294 is biased into engagement with a fixed contact 296 of the switch which in turn is connected through a single pole, single throw, normally open switch 298 to a solenoid 300, which is also connected to the line $L_2$. The other fixed contact 302 of the single pole, double throw switch is connected through a single pole, single throw, normally open switch 304 to one side of the normally open pushbutton H. The other side of the pushbutton H is connected through the solenoid 36 to the line $L_2$. The solenoid 300 includes a reciprocable armature connected to one end of a rod 306, the other end of which is connected to a level 308 which is connected to the conventional ribbon control mechanism of the typewriter D. As is well known to those skilled in the art, the ribbon control mechanism adjusts the inking ribbon of the typewriter in a vertical direction to provide that the type characters may strike the ribbon at a plurality of desired positions across the ribbon and also adjusts the ribbon to space it out of operative relation with the type when it is desired to cut stencils. This mechanism is normally controlled by a ribbon control or color control key 310 located adjacent the keyboard of the typewriter as shown in FIGS. 1 and 2. In the specific embodiment herein shown, when the rod 306 is in its advanced position shown in FIG. 2, the ribbon will be in operative position relative to the type, while when the rod 306 is in a retracted position, or in other words when the armature of the solenoid has been drawn upwardly thereinto, the ribbon will be spaced out of operative relationship with the type.

The rod 306 has mounted thereon a cam 312 which is engageable with the movable contact 294 of the single pole, double throw switch to move the contact 294 out of engagement with the contact 296 and into engagement with the contact 302 when the solenoid 300 is energized to retract the rod 306. The rod 306 also carries a cam follower or roller 314 engageable by the cam 46 on the cam shaft 20 to move the rod 306 from its retracted position back to the advanced position shown in FIG. 2. The normally open single pole, single throw switches 298 and 304 are actuated by a pair of switch actuating members 316 and 318, respectively, which actuating members are mounted for movement with the carriage 157 of the typewriter. As will be apparent from FIG. 2, when the carriage is returned to its rightward limit or return position, the switch actuating member 318 will engage the movable contact of switch 304 to close the switch. As is well known, during return of the carriage of the typewriter there is a certain amount of overtravel of the carriage. During this overtravel of the carriage the switch actuating member 316 will engage the movable contact of the switch 298 to close the switch momentarily. However, in the normal return position of the carriage the switch 298 will be open. Thus, in order to effect momentary closing of the switch 298 and to effect closing of the switch 204, the carriage must be returned to its rightward limit position by actuation of the carriage return key 270 shown in FIG. 1.

The operation of the apparatus described above will now be described with particular reference to FIG. 2. It will be assumed that the electrical portions of the typewriter D have been energized, that the motor 10 has been energized, and that the lines $L_1$ and $L_2$ are connected to a source of electrical power. The various control elements, cams and switches shown in FIG. 2 are in the position they would be in immediately following a transfer operation, wherein a card was ejected from the platen and a new card fed into the platen. The carriage is, as shown in FIG. 2, in its rightward limit position in preparation for a typing operation. It will be noted that the rod 306 connected to the armature of the solenoid 300 is in its advanced position so that the ribbon of the typewriter is in operative relationship to the type carriers. Accordingly, actuation of the keys of the typewriter will cause characters to be printed on a record card or the like engaged on the platen in order to provide a line of typing above the stencil window in the card as shown in FIG. 1. After the first line has been typed, the carriage return key 270 is depressed by the operator, whereupon the carriage will be returned to its rightward position causing momentary closing of the switch 298. The closing of the switch 298 will effect energizing of the solenoid 300, inasmuch as the contacts 294 and 296 of the single pole, double throw switch are in engagement. Accordingly, the rod 306 will be retracted and through its connection to the member 308 will cause the ribbon to be spaced out of operative engagement with the type.

As a result of the retraction of the rod 306 the contact 294 will be moved out of engagement with the contact 296 and into engagement with the contact 302. Inasmuch as there is no spring return provided for the rod 306 or the armature of the solenoid 300, the rod will remain in the retracted position with the roller 314 next adjacent the cam 46 and with the switch contact 294 in engagement with the contact 302. Accordingly, on successive returns of the typewriter carriage the momentary closing of the switch 298 will not cause energizing of the solenoid 300. When the last line has been typed on the stencil and it is desired to eject the stencil and transfer a new stencil onto the platen, the carriage return button 270 is depressed to cause the carriage to be returned and the switch 304 to be closed. With the carriage in its returned position, the special pushbutton H may be depressed, which will cause energizing of the solenoid 36, it being remembered that the movable contact 294 has previously been engaged with the contact 302. Energizing of the solenoid 36 need, of course, only be momentary and will cause the clutch control rod 32 to be drawn out of interfering relation with the toothed lever 24 so that the lever 24 will be engaged with the ratchet wheel 22, thus connecting the shaft 20 to the motor 10 which is continually energized. Accordingly, the shaft 20 will be rotated one complete revolution, as controlled by the single revolution clutch 18. During the single revolution of the cam shaft 20 the card advance rolls 64 will be driven continually.

As shown in FIG. 2, it is preferred that the sprocket 62 be substantially smaller than the sprocket 58 in order to provide a rapid rotation for the roll 64. Also, during the single rotation of the cam shaft 20, the cams 48, 50, 52 and 54 will rotate in timed relation to each other to effect feeding of the lowermost card in the supply stack B to the drive roll 64 for advancement of the card into the stencil moistening position, to provide for transfer of the card then in the stencil moistening position to the stencil blotting position, to provide for transfer of the card in the stencil blotting position into engagement with the right-hand end of the track C as viewed in FIG. 1, and to provide for retraction of the stencil moistening and blotting wicks during the card transfer operation. Also, at the same time the card which was previously in the rightward end of the track C will be moved longitudinally along the track into engagement with the card advance mechanism 170 for propelling of the card into the track element 156 and thus onto the platen. As has been described above, the card advance mechanism is drivingly connected to the shaft 44, which in turn is drivingly connected to the shaft 20 by the sprockets 38 and 42 and chain 40. Accordingly, it will be seen that the shaft 44 and thus the drive roll 172 of the card advancing mechanism 170 will be continually rotated during the rotation of the shaft 20.

From FIGS. 2 and 5 it can be seen that it is preferred that the sprocket 42 be substantially smaller than the sprocket 38 and that the pinion 184 on the shaft 182, which drives the drive roller of the card advance mechanism 170, be substantially smaller than the gear 185 on the shaft 188 connected to the shaft 144 so that the drive roller 172 of the card advance mechanism as well as the ejection rollers 254 will be driven at a rapid speed. On the other hand, as shown in FIG. 5, it is preferred that the gear 206 connected to the cam shaft 204 for controlling the card hold-down and card ejection mechanism be larger than the pinion 208 on the shaft 188 in order that the shaft 204 operate at substantially the same speed as the shaft 20. The ejection of the card previously on the platen by the ejection means of FIG. 8 and the timed actuation of the hold-down mechanism of FIG. 7 has been described above, and further detailed description thereof is not believed to be necessary. Suffice to say that during the transfer of a card from the rightward end of the track C onto the platen E' the card previously on the platen will be ejected upwardly and laterally over the platen and into the hopper F, and when the new card has been fed onto the platen the hold-down mechanism will resiliently engage the same with the platen in preparation for the typing operation. While it is preferred in the specific embodiment hereof to eject the cards into a hopper, it will, of course, be apparent that if desired the ejection of the cards could be onto means such as a conveyor or the like for transporting cards to a storage station or another operating station.

As the cam shaft 20 completes one revolution after intial movement thereof, the cam 46 will engage the roller 314 on the rod 306 to move the rod back to the position shown in FIG. 2. This will permit the single pole, double throw switch to move out of engagement with the contact 302 and into engagement with the contact 296. Also, the advancement of the rod 306 by the cam 46 will, through the rod 308, condition the ink ribbon control mechanism to place the ribbon in operative engagement with the type. Inasmuch as the movable contact 294 is now out of engagement with the contact 302, it will be observed that even though the pushbutton H is maintained in a depressed condition, or if the pushbutton is depressed again after a card transfer operation, there will be no energizing of the solenoid 36 to effect another revolution of the cam shaft 20. Accordingly, it can be seen that in order to provide another card transfer operation it is first necessary to depress the carriage return key 270 to effect momentary closing of the switch 298 and momentary energizing of the solenoid 300. Thus, when the machine is initially set up, in order to advance a card onto the platen E', it will be necessary to alternately depress the carriage return key 270 and special pushbutton H a sufficient number of times to cause the bottom card in the stack B to be advanced through its several discrete transfer positions, heretofore described, and onto the platen.

It can be seen that there has been provided a novel and improved apparatus for automatically feeding thin, flexible tabulating cards and the like from a supply stack through a plurality of discrete operating positions and directly onto the platen of a typewriter and further for ejecting the card into a collection hopper at the end of a typing operation. All of the transfer operations are accomplished in an automatic manner, requiring no handling of the cards by the operator between the time the cards are loaded in the supply hopper until they are removed from the collection hopper. The advancement of the flexible, hard to handle tabulating cards in spaced apart succession from the supply stack to the platen is accomplished in a manner which minimizes, if not eliminates, jamming of the cards during the transfer operation. A particular advantage of the apparatus herein described is that the record cards are fed directly onto the platen without requiring intermediate transfer mechanisms to move the card from the supply stack to the platen for typing and then removing the card from the platen and back to the supply stack for discharge after the typing operation has been completed. Therefore, the apparatus of this invention provides a faster cycle of operation, contributing to an increased productivity. Additionally, as can be appreciated from the foregoing description, if desired, special control mechanisms may be provided to effect variable line spacing and to provide for movement of the inking ribbon into and out of operative engagement with the type. The interlock feature provided by the control switches 293, 298 and 304 assures that actuation of the transfer mechanism may not occur unless the carriage is in its returned position, thus precluding inadvertent transfer of incompleted cards. The apparatus of the invention of this application, although providing the accurate timed operation of the various elements of the apparatus, is also rugged and durable so as to provide reliable, trouble-free service over an extended period.

While the invention has been described in terms of the specific embodiment disclosed in the accompanying drawings, it is to be understood that various modifications and alterations can be made in the structure described and shown without departing from the scope of the invention. Further, while the apparatus herein shown and described is particularly suited for use with the difficult to handle, thin, flexible tabulating cards and the like, it will be appreciated that the apparatus may also be useful with other types of record cards. Accordingly, the foregoing description and accompanying drawings are to be taken only in an illustrative sense and not as limiting the invention.

It is also to be understood that the language used in the following claims is intended to cover all of the generic and specific features of the invention herein described and all statements of the scope of the invention which, as a matter of language, might be said to fall therebetween.

Having thus described my invention, I claim:

1. In apparatus of the type described, the combination of character forming means including a platen, a card supporting track extending parallel to the platen and being constructed and arranged to support a record card and the like for endwise movement along the track from a position spaced from the platen in a direction longitudinally thereof to a second position next adjacent to and alongside the platen, retractable hold-down means for engaging a next adjacent record card and the like with the platen, transfer means for moving a record card and the like along said track to said second position alongside the platen, means for removing a card engaged with the platen, and means for operating the hold-down means, transfer means, and card removing means in timed relation to each other.

2. In apparatus of the type described, the combination of character forming means including a platen, a card supporting track extending parallel to the platen and being constructed and arranged to support a record card and the like on an edge thereof and for endwise movement along the track in one direction from a position spaced from the platen in a direction longitudinally thereof to a second position next adjacent to and alongside the platen, transfer means for moving a record card and the like in said one direction endwise along said track and into said second position alongside the platen, and means for ejecting a record card and the like disposed alongside the platen in a direction vertically upwardly of and laterally of the platen in timed relation to the operation of said transfer means.

3. In apparatus of the type described, the combination of character forming means including a platen, a card supporting track extending parallel to the platen and being constructed and arranged to support a record card and the like on an edge thereof and for endwise movement along the track from a position spaced from the platen in a direction longitudinally thereof to a second position next adjacent to and alongside the platen, retractable hold-down means for engaging a next adjacent record card and the like with the platen, transfer means for moving a record card and the like along said track to said second position alongside the platen, means for ejecting a record card or the like engaged with the platen in a direction vertically upwardly of and laterally over the platen, and means for operating the hold-down means, transfer means, and card ejecting means in timed relation to each other.

4. In apparatus of the type described, the combination of character forming means including a movable carriage supporting a cylindrical platen angularly indexable about its longitudinal axis and extending in the direction of movement of the carriage, a track extending parallel to the platen and constructed and arranged to support a record card and the like on one edge thereof for endwise movement along the track and including a first fixed track element, a second track element mounted for movement with the carriage and disposed alongside the platen and arranged in end-to-end alignment with the first track element, retractable hold-down means mounted for movement with the carriage and engageable with a record card and the like disposed alongside the platen to engage the card with the platen, transfer means to move a record card and the like from said first track element to said second track element when the carriage is in a predetermined position, means mounted for movement with the carriage for removing a card engaged on the platen, and means for operating the hold-down means, transfer means and card removing means in timed relation to each other.

5. In apparatus of the type described, the combination of character forming means including a movable carriage supporting a cylindrical platen angularly indexable about its longitudinal axis and extending in the direction of movement of the carriage, a track extending parallel to the platen and constructed and arranged to support a record card and the like on one edge thereof for endwise movement along the track and including a first fixed track element, a second track element mounted for movement with the carriage and disposed alongside the platen and arranged in end-to-end alignment with the first track element, retractable hold-down means mounted for movement with the carriage and engageable with a record card and the like disposed alongside the platen to engage the card with the platen, transfer means to move a record card and the like from said first track element to said second track element when the carriage is in a predetermined position, card ejection means mounted for movement with the carriage and engageable with a record card and the like engaged on the platen to eject the card vertically upwardly of and laterally of the platen, and means for operating the hold-down means, transfer means and ejection means in timed relation to each other.

6. In appartus of the type described, the combination of character forming means including a platen, a card supporting track extending parallel to the platen and being constructed and arranged to support a record card and the like on one edge thereof and for endwise movement along the track in one direction from a position spaced from the platen in a direction longitudinally thereof to a second position next adjacent to and alongside the platen, transfer means for moving a record card and the like in said one direction endwise along said track and into said second position alongside the platen, and means for ejecting a record card and the like disposed alongside the platen in a direction vertically upwardly of and laterally of the platen in timed relation to the operation of said transfer means and including a driven ejection roll extending parallel to the platen, and a pressure member movable toward and away from the ejection roll and engageable with a card disposed between the ejection roll and pressure member to engage the card in frictional driving contact with the ejection roll.

7. In apparatus of the type described, the combination of character forming means including a movable carriage supporting a cylindrical platen angularly indexable about its longitudinal axis and extending in the direction of movement of the carriage, means to support a record card or the like vertically on one edge thereof with the card disposed alongside and extending parallel to the platen, hold-down means for engaging a record card and the like with the platen and constructed and arranged to provide that angular movement of the platen in one direction will advance a card engaged therewith along a path extending vertically upwardly of the platen and laterally over the platen, and a card engageable driven ejection roll and a pressure member mounted for movement with the carriage and disposed above the platen and on opposite sides of the path of movement of a card advanced by the platen, the ejection roll extending parallel to the platen, the pressure member being mounted for movement toward and away from the ejection roll to frictionally engage a card with the ejection roll for propelling of the card upwardly and laterally over the platen.

8. In apparatus of the type described the combination of character forming means including a movable carriage supporting a platen extending in the direction of movement of the carriage, a track extending parallel to the platen and constructed and arranged to support a record card and the like on one edge thereof for endwise movement along the track and including a first fixed track element, a second track element mounted for movement with the carriage and disposed alongside the platen and arranged in end-to-end alignment with the first track element, a card supply station, means to deliver cards at said supply station one at a time to said first track element, the track elements being disposed closely adjacent each other in one position of the carriage, and advance means to move a card on said first track element to said second track element including a card engageable drive roll disposed next adjacent the next adjacent ends of said track elements, a pressure member mounted on the side of said track opposite the drive roll for movement toward and away from the drive roll, means for advancing a card along the first track element and into position between the drive roll and pressure member, and means to operate the pressure member and the means for advancing a card along the first track element in timed relation to each other.

9. In apparatus of the type described, a stack of record cards or the like each having a stencil portion of tissue or the like, means for removing the lowermost card in the stack and advancing the same in an edgewise direction through discrete stencil moistening and stencil blotting positions to a transfer position in spaced relation to preceding and succeeding cards, stencil moistening and blotting means movable into and out of contact with the stencils of cards disposed in said stencil moistening and blotting positions, transfer means for moving the card in said transfer position in an endwise direction, and means for operating the card removing and advancing means, stencil moistening and blotting means and transfer means in timed relation to each other.

10. In apparatus of the type described, a stack of record cards or the like having a stencil portion of tissue or the like, means for removing the lowermost card in the stack and advancing the same in an edgewise direction, card advance means disposed along a path extending in the direction of movement of a card by the card removing means for advancing a card through discrete stencil moistening and stencil blotting positions to a transfer position in spaced apart relation to preceding and succeeding cards, stencil moistening and blotting means movable toward and away from cards in said stencil moistening and blotting positions, card transfer means for moving a card in said transfer position in an endwise direction, and a plurality of intermittently operated cams operatively associated with said card removing means, advance means, stencil moistening and blotting means and transfer means for operating the same in timed relation to each other.

11. In apparatus of the type described, a stack of record cards or the like each having a stencil portion of tissue or the like, a reciprocable movable laterally of the stack and engageable with an edge of the lowermost card in the stack to move the lowermost card in an edge wise direction, a card supporting track spaced from said slide in the direction of movement of the card by the slide and extending at right angles to the direction of movement of the slide, drive roll means in the path of movement of a card by said slide for engaging the card and moving the same into a stencil moistening position, and transfer means for moving a card from said stencil moistening position through a stencil blotting position and onto said track in discrete steps and in spaced relation to preceding and succeeding cards.

12. In apparatus of the type described, a stack of record cards or the like each having a stencil portion of tissue or the like, a reciprocable slide movable laterally of the stack and engageable with an edge of the lowermost card in the stack to move the lowermost card in an edgewise direction, a card supporting track spaced from said slide in the direction of movement of the card by the slide and extending at right angles to the direction of movement of the slide, drive roll means in the path of movement of a card by said slide for engaging the card and moving the same into a stencil moistening position, transfer means for moving a card from said stencil moistening position through a stencil blotting position and onto said track in discrete steps and in spaced relation to preceding and succeeding cards, stencil moistening and blotting means movable toward and away from cards in said stencil moistening and blotting positions, and means for operating said slide, drive roll means, transfer means and stencil moistening and blotting means in timed relation to each other.

13. In apparatus of the type described, a stack of record cards or the like each having a stencil portion of tissue or the like, a reciprocable slide movable laterally of the stack and engageable with an edge of the lowermost card in the stack to move the lowermost card in an edgewise direction, a card supporting track spaced from said slide in the direction of movement of the card by the slide and extending at right angles to the direction of movement of the slide, drive roll means in the path of movement of a card by said slide for engaging the card and moving the same into a stencil moistening position, transfer means for moving a card from said stencil moistening position through a stencil blotting position and onto said track in discrete steps and in spaced relation to preceding and succeeding cards, a second slide movable longitudinally of said track and engageable with a card on said track to move the card in an endwise direction, and means for operating said slide, drive roll means, transfer means and second slide in timed relation to each other.

14. In apparatus of the type described, a movable carriage, an angularly indexable platen mounted for movement with the carriage and extending in the direction of movement of the carriage, intermittently operated transfer means for moving a record card and the like longitudinally of the platen from a position spaced longitudinally of the platen to a position alongside the platen wherein the card is supported vertically on one edge thereof, retractable hold-down means for engaging a card on the platen, intermittently operated card removal means for removing a card held on the platen by said hold-down means, and means to operate said transfer means and removal means in timed relation including electrical control means comprising an electrical circuit having means responsive to carriage return to condition said control means for selective initiation of operation of said transfer means and means responsive to operation of said transfer means to condition said circuit to prevent a subsequent operation of said transfer means prior to a subsequent return movement of the carriage.

15. In apparatus of the type described, a movable carriage, an angularly indexable platen mounted for movement with the carriage and extending in the direction of movement of the carriage, intermittently operated transfer means for moving a record card and the like longitudinally of the platen from a position spaced longitudinally of the platen to a position alongside the platen wherein the card is supported vertically on one edge thereof, retractable hold-down means for engaging a card on the platen, intermittently operated card removal means for removing a card held on the platen by said hold-down means, and means to operate said transfer means and removal means in timed relation including electrical control means comprising an electrical circuit having switch means operated in response to carriage return to condition said circuit for operation of said transfer means, manually operable second switch means to effect initiation of operation of said transfer means, and third switch means including the first switch means responsive to operation of said transfer means to condition said circuit to prevent subsequent initiation of operation of said transfer means prior to a subsequent operation of the first switch means.

16. In apparatus of the type described, a vertically extending stack of horizontally extending tabulating cards and the like, a card supporting track extending generally parallel to said stack in spaced relation thereto for supporting a vertically arranged card on one edge thereof for movement in an endwise direction, curved card supporting means extending from adjacent said stack to adjacent said track for supporting a card during movement from the stack to the track and for effecting angular indexing of the card from a horizontal to a vertical position during such movement, means for removing cards one at a time in spaced succession from said stack and advancing the cards in spaced succession along said card supporting means and onto said track, transfer means for moving a card on said track in an endwise direction, and means for operating the card removing and advancing means and said transfer means in timed relation to each other.

17. In apparatus of the type described, a vertically extending stack of horizontally extending tabulating cards and the like, a card supporting track extending generally parallel to said stack in spaced relation thereto for supporting a vertically arranged card on one edge thereof for movement in an endwise direction, curved card supporting means extending from adjacent said stack to adjacent said track for supporting a card during movement from the stack to the track and for effecting angular indexing of the card from a horizontal to a vertical position during such movement, means for removing cards one at a time in spaced succession from said stack and advancing a card into a first position on said card supporting means, card transfer means for moving cards in spaced succession along said card supporting means from said first position to said track, and means for operating the card removing and advancing means and said transfer means in timed relation to each other.

18. In apparatus of the type described, a vertically extending stack of horizontally extending tabulating cards and the like, a card supporting track extending generally parallel to said stack in spaced relation thereto for supporting a vertically arranged card on one edge thereof for movement in an endwise direction, curved card supporting means extending from adjacent said stack to adjacent said track for supporting a card during movement from the stack to the track and for effecting angular indexing of the card from a horizontal to a vertical position during such movement, a reciprocable slide for removing cards from said stack one at a time in spaced succession and in an edgewise direction, drive roll means in the path of movement of a card by said slide for moving the card in an edgewise direction and into a first position on said card supporting means, transfer means for advancing a card from said first position to said track in spaced relation to preceding and succeeding cards, and means for operating said slide, drive roll means and transfer means in timed relation to each other.

19. In apparatus of the type described, a vertically extending stack of horizontally extending tabulating cards and the like, a card supporting track extending generally parallel to said stack in spaced relation thereto for supporting a vertically arranged card on one edge thereof for movement in an endwise direction, curved card supporting means extending from adjacent said stack to adjacent said track for supporting a card during movement from the stack to the track and for effecting angular indexing of the card from a horizontal to a vertical position during such movement, means for removing cards one at a time in spaced succession from said stack and advancing a card into first position on said card supporting means, card transfer means for moving cards in spaced succession along said card supporting means from said first position to said track including an oscillatable member mounted for movement generally parallel to said card supporting means and the direction of movement of a card along said card supporting means, said oscillatable member carrying a retractable spring biased pivoted member engageable with an edge of a card on said card supporting means to move the card toward said track in response to movement of the oscillatable member in a corresponding direction, and means for operating the card removing and advancing means and said transfer means in timed relation to each other.

20. In apparatus of the type described, a vertically extending stack of horizontally extending tabulating cards and the like, a card supporting track extending generally parallel to said stack in spaced relation thereto for supporting a vertically arranged card on one edge thereof for movement in an endwise direction, curved card supporting means extending from adjacent said stack to adjacent said track for supporting a card during movement from the stack to the track and for effecting angular indexing of the card from a horizontal to a vertical position during such movement, a reciprocable slide for removing cards from said stack one at a time in spaced succession and in an edgewise direction, drive roll means in the path of movement of a card by said slide for moving the card in an edgewise direction and into a first position on said card supporting means, transfer means for advancing a card from said first position to said track in spaced relation to preceding and succeeding cards including an oscillatable member mounted for movement generally parallel to said card supporting means and the direction of movement of a card along said card supporting means, said oscillatable member carrying a retractable spring biased pivoted member engageable with an edge of a card on said card supporting means to move the card toward said track in response to movement of the oscillatable member in a corresponding direction, and means for operating the slide, drive roll means, and transfer means in timed relation to each other.

References Cited in the file of this patent

UNITED STATES PATENTS

| | | |
|---|---|---|
| 924,198 | Sinisi | June 8, 1909 |
| 1,069,958 | Knurck | Aug. 12, 1913 |
| 1,200,129 | Peirce | Oct. 3, 1919 |
| 2,224,771 | Mills | Dec. 10, 1940 |
| 2,240,568 | Mills et al. | May 6, 1941 |